(12) United States Patent
Shabtay

(10) Patent No.: US 7,739,398 B1
(45) Date of Patent: Jun. 15, 2010

(54) DYNAMIC LOAD BALANCER

(75) Inventor: Lior Shabtay, Ganei Tikva (IL)

(73) Assignee: Avaya Inc., Basking Ridge, NJ (US)

( * ) Notice: Subject to any disclaimer, the term of this patent is extended or adjusted under 35 U.S.C. 154(b) by 2527 days.

(21) Appl. No.: 09/718,143

(22) Filed: Nov. 21, 2000

(51) Int. Cl.
G06F 15/16 (2006.01)
G06F 15/173 (2006.01)
H04L 12/28 (2006.01)

(52) U.S. Cl. .................... 709/232; 709/238; 709/239; 370/389; 370/392

(58) Field of Classification Search ................ 709/238, 709/239, 240, 229; 718/105
See application file for complete search history.

(56) References Cited

U.S. PATENT DOCUMENTS

| | | | | |
|---|---|---|---|---|
| 5,774,660 A | * | 6/1998 | Brendel et al. | 709/201 |
| 6,098,093 A | * | 8/2000 | Bayeh et al. | 709/203 |
| 6,157,644 A | * | 12/2000 | Bernstein et al. | 370/392 |
| 6,327,622 B1 | * | 12/2001 | Jindal et al. | 709/228 |
| 6,374,300 B2 | * | 4/2002 | Masters | 709/229 |
| 6,389,462 B1 | * | 5/2002 | Cohen et al. | 709/218 |
| 6,473,802 B2 | * | 10/2002 | Masters | 709/229 |
| 6,779,017 B1 | * | 8/2004 | Lamberton et al. | 709/203 |

FOREIGN PATENT DOCUMENTS

EP 0909062 A1 4/1999
EP 0980167 A1 2/2000

OTHER PUBLICATIONS

Cisco Systems Inc:; "Catalyst 6000 Family Accelerated Server Load Balancing"; http://www.cisco.com/warp/public/cc/pd/si/casi/ca6000/tech/aslb_wp.htm; pp. 1-14.*
P. Srisuresh, D.Gan; RFC 2391; "Load Sharing using IP Network Address Translation (LSNAT)"; Aug. 1998; pp. 1-18.*
Cisco Systems, Inc.; "Catalyst 6000 Family Software Configuration Guide". Chapter 43, "Configuring Accelerated Server Load Balancing".*
Cisco Systems Inc; "Catalyst 6000 Family Accelerated Server Load Balancing";http://www.cisco.com/warp/public/cc/pd/si/casi/ca6000/tech/aslb_wp.htm.*
Cisco System Inc.; "Catalyst 6000 Family Accelerated Server Load Balancing"; http://www.cisco.com/warp/public/cc/pd/si/casi/ca6000/tech/aslb_wp.htm; pp. 1-14.

(Continued)

*Primary Examiner*—Aaron Strange
(74) *Attorney, Agent, or Firm*—Joseph B. Ryan; Jason Paul DeMont; Wayne S. Breyer

(57) ABSTRACT

A method of accelerating the operation of a load balancer by an accelerator switch. The method includes receiving, by the accelerator switch, packets directed to the load balancer, determining, for at least some of the received packets, whether the packets match an entry of a list of packet groups, by comparing fewer than five parameters of the packets to respective fields of entries of the list, and forwarding, by the accelerator switch, at least some of the received packets, directly to their destination, responsive to the determining.

3 Claims, 7 Drawing Sheets

OTHER PUBLICATIONS

Egevang, K., et al., "The IP Network AddressTranslator (NAT)", "http://www.faqs.org/rfcs/rfc1631.html XP002264271", May 1994, pp. 1-10, Publisher: Network Working Group.

Damani, et al., "ONE-IP: techniques for hosting a service on a cluster of machines", "Computer Networks and ISDN Systems", Sep. 1, 1997, pp. 1019-1027, vol. 29, No. 8-13, Publisher: North Holland Publishing, Published in: NL.

Varma, Suchita, "CA Application No. 2,359,855 Office Action Nov. 21, 2006", , Publisher: CIPO, Published in: CA.

Bali, Umang, "CA Application No. 2,359,855 Office Action Jan. 28, 2005", , Publisher: CIPO, Published in: CA.

Varma, Suchita, "CA Application No. 2,359,855 Office Action Feb. 3, 2009", , Publisher: CIPO, Published in: CA.

"KR Application No. 2001-0072186 Office Action Jun. 25, 2008", , Publisher: KIPO, Published in: KR.

* cited by examiner

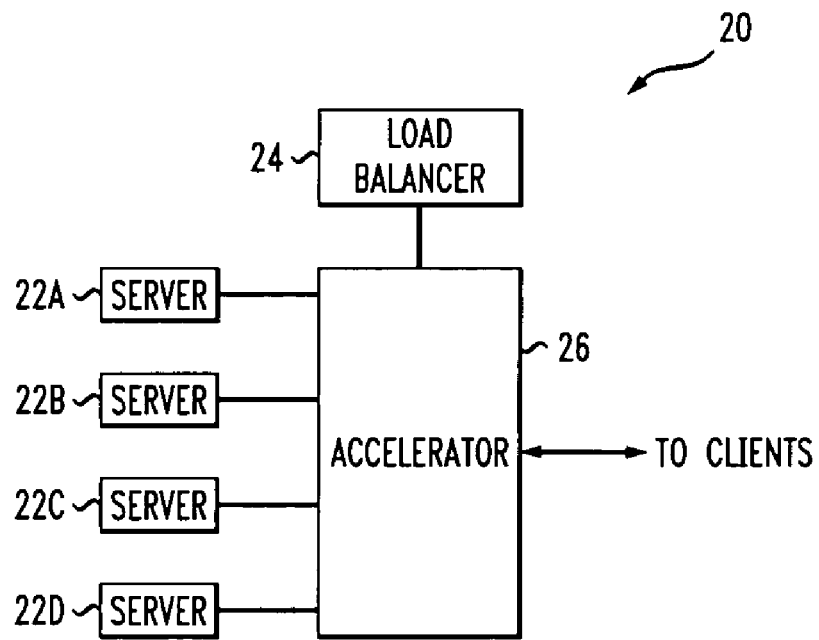
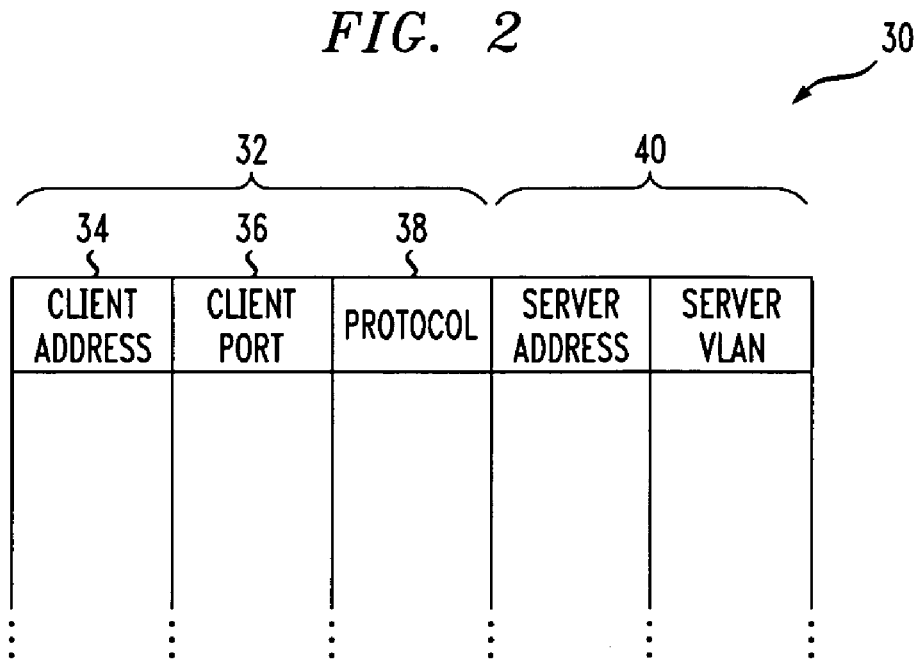

DYNAMIC LOAD BALANCER

FIELD OF THE INVENTION

The present invention relates to communication networks and in particular to server load balancing in such networks.

BACKGROUND OF THE INVENTION

Busy Web sites are often hosted by a farm of a plurality of servers, each of which handles connections with a portion of the clients. Generally, such a farm includes a load balancer, which receives the packets (referred to also as frames) directed to the Web site of the farm. The load balancer distributes the packets between the plurality of servers, which host the site, such that all the packets of a single client session are transferred to a single server. Server load balancers are also used for other purposes, such as, redirection of packets to proxy caches.

In some cases, the load on the load balancer is very large and an additional and/or a newer load balancer is required. Replacing and/or adding load balancers, however, may require intensive programming such that the new balancer operates according to the operation rules of the old load balancer or that the additional load balancer properly cooperates with the old load balancer.

A load-balancing accelerator solves this problem by learning how to distribute packets directed to the Web site (i.e., having the destination IP address of the Web site) based on the behavior of the old load balancer, referred to herein as the accelerated load balancer. The packets directed from clients to the Web site are routed to the load balancer through the accelerator which listens to the packets and creates entries in an acceleration table for each group of packets. The group of packets are defined based on the five parameters which generally define communication sessions, i.e., the source and destination IP addresses, the protocol and the source and destination ports. In addition, the packets from the load balancer to the servers pass through the accelerator which listens to the packets and searches for matching entries. The accelerator extracts, from packets forwarded by the load balancer which match entries in the table, the destination server of the packets and adds it to the respective entry. Subsequent packets passing through the accelerator, from clients to the load balancer, which match an entry of the table that includes a server identification, are forwarded by the accelerator directly to the server.

Some load balancers, referred to herein as triangulation load balancers, change the destination MAC address and VLAN of the packets they forward, according to the load balancing decisions, but do not change the information in the IP header of the packets. Other load balancers change the destination IP address and/or port of packets which they forward to the servers, in a scheme referred to as half NAT (Network Address Translation) forwarding. These half NAT load balancers must intercept the packets from the servers to the clients in order to change the source address of these packets from the address of the servers to the address of the farm, i.e., the Internet site. Other load balancers change both the source and destination IP addresses of packets which they forward to the servers. These load balancers are referred to as full NAT balancers.

The above described accelerator is suitable for use with triangulation load balancers. These accelerators, however, are not suitable for use with half NAT and full NAT load balancers since the change in the IP address by the load balancer prevents the accelerator from finding entries in the table which match the packets forwarded to the servers.

SUMMARY OF THE INVENTION

An aspect of some embodiments of the present invention relates to a load balancing accelerator for load balancers which perform half NAT and/or full NAT forwarding.

An aspect of some embodiments of the invention relates to a load-balancing accelerator which identifies groups of packets which should be forwarded to the same server based on a set of parameters different than the set including the five parameters which are conventionally used to identify communication sessions, i.e., the source and destination IP addresses, the protocol and the source and destination ports. In some embodiments of the invention, the set of parameters uses fewer than the above five parameters are used to identify the groups of packets which are directed to the same server.

The prior art generally uses the set of five parameters which identify communication sessions in differentiating between different groups, based on the general practice that load balancers relate the same way to packets belonging to a single session. Many load balancers, however, relate the same way to larger groups defined by sets of parameters including fewer parameters. By using these smaller sets of parameters in grouping the packets, the operation of the accelerator is simplified (e.g., a load balancing table of the accelerator is kept small), without violating load balancing rules of the accelerated load balancer. In addition, in some cases it is possible to identify communication sessions based on different sets of parameters, as some of the parameters in the set may be superfluous in a specific context. Using fewer parameters simplifies the operation of the load-balancing accelerator and reduces the amount of storage space required.

In some embodiments of the invention, the groups of packets are identified based on parameters which are not changed by a half NAT load balancer, for example, the IP source address, the IP source port and the protocol. By identifying groups of packets only based on parameters which are not changed by a half NAT load balancer, it is possible to easily perform acceleration of half NAT load balancers. It is noted that unlike general packets flowing through packet based networks, packets directed to an Internet site, which carry a common IP source address and a common source port, generally carry the same IP destination address and destination port, and therefore are directed to the same server by the load balancer.

In some embodiments of the invention, in which a load balancer which currently directs all the packets from a single client to the same server is accelerated, the accelerator identifies groups of packets only based on the source IP address of the packets. Using only a single parameter in grouping packets further simplifies the accelerator.

An aspect of some embodiments of the invention relates to a load-balancing accelerator which matches packets directed by an accelerator to a load-balancer with packets received, by the accelerator, from the load balancer. The matching is performed based on portions of the packets which are not changed by load balancers operating in the full NAT mode, and have a low probability of being identical for two different packets. The accelerator creates entries of a load balancing table based on information extracted from both the matched packets.

An aspect of some embodiments of the invention relates to a load-balancing accelerator which uses values of different sets of parameters for different received packets in determining to which group of packets the received packet belongs.

For example, packets belonging to different protocols may receive different handling. The accelerator determines for packets of a first protocol to which group they belong based on a first set of parameters, while for packets of a second protocol, a second set of parameters is used.

An aspect of some embodiments of the invention relates to a load-balancing accelerator which allows a user to configure the parameters used in defining the groups of packets which are directed to the same server. In some embodiments of the invention, if the accelerated load balancer forwards all packets from the same client to the same server the user configures the accelerator to define groups based on the source IP address. If, however, the accelerated load balancer forwards packets from the same client to different servers (e.g., from different ports of the same client), the user configures the accelerator to define groups based on the source IP address and the source port.

An aspect of some embodiments of the invention relates to a load-balancing accelerator which automatically determines an operation mode of a load balancer being accelerated. In some embodiments of the invention, the accelerator determines whether the load balancer operates in full NAT, half NAT or a triangulation mode. Alternatively or additionally, the accelerator determines a smallest set of parameters the values of which uniquely define the server to which packets are forwarded by the load balancer. For example, in some embodiments, the accelerator determines whether the load balancer may forward packets from a single client to two different servers.

In some embodiments of the invention, the accelerator matches parameters of packets (referred to herein as monitored packets) forwarded to the load balancer with parameters of the same packets received from the load balancer. According to the differences in the same packet between its state as forwarded to the load balancer and as received from the load balancer, the accelerator determines the operation mode of the load balancer.

In some embodiments of the invention, the monitored packets comprise packets received from clients on their way to the servers, which are forwarded to the load balancer as part of their normal handling. Alternatively or additionally, the monitored packets comprise packets received from the servers on their way to clients, which are forwarded to the load balancer as part of their normal handling. Further alternatively or additionally, the monitored packets comprise packets specially generated for determining the operation mode of the load balancer.

The accelerator stores sufficient identification information of the monitored packets forwarded to the load balancer such that they can be matched with the packets as received from the load balancer after they were handled by the load balancer. The identification information includes, for example, a leading portion of the payload of the packet or identification numbers of a transport protocol such as TCP. Alternatively or additionally, the identification information includes a unique tag implanted in the packets by the accelerator. Alternatively or additionally, during a test period of the load balancer, the accelerator forwards to the load balancer a limited number of packets and does not forward additional packets until respective packets are received from the load balancer.

There is therefore provided in accordance with an embodiment of the invention, a method of accelerating the operation of a load balancer by an accelerator switch, including receiving, by the accelerator switch, packets directed to the load balancer, determining, for at least some of the received packets, whether the packets match an entry of a list of packet groups, by comparing fewer than five parameters of the packets to respective fields of entries of the list, and forwarding, by the accelerator switch, at least some of the received packets, directly to their destination, responsive to the determining.

Optionally, determining whether the packets match an entry of the list includes comparing three or fewer parameters of the packets to respective fields in the list. Alternatively or additionally, determining whether the packets match an entry of the list includes comparing two parameters or a single parameter of the packet to a respective field in the list. Optionally, determining whether the packets match an entry of the list includes comparing a single parameter of the packet to a respective field in the list.

Possibly, receiving packets directed to the load balancer includes receiving packets directed from a client to a Web site associated with the load balancer and forwarding at least some of the received packets directly to their destination includes forwarding the packets from the clients to one of the servers of the Web site without passing through the load balancer. Optionally, determining whether the packets match an entry of the list includes comparing the source IP address and source port of the packets to respective fields in the list. In some embodiments of the invention, the compared parameters do not include a destination address.

Alternatively or additionally, receiving packets directed to the load balancer includes receiving packets directed from a server to a client and forwarding at least some of the received packets directly to their destination includes forwarding the packets from the server to the client without passing through the load balancer. Optionally, determining whether the packets match an entry of the list includes comparing the destination IP address and destination port of the packets to respective fields in the list. In some embodiments of the invention, the compared parameters do not include a source address.

In some embodiments of the invention, forwarding at least some of the received packets includes forwarding packets for which a matching entry was found. Optionally, the load balancer operates in a half NAT or full NAT mode.

There is further provided in accordance with an embodiment of the invention, a method of creating an entry in a list which correlates between packet groups and respective destination servers, including receiving, by an accelerator, a packet directed from or to a load balancer which changes at least the destination IP address of packets it forwards to servers, and creating, by the accelerator, an entry in the list of destination servers, responsive to the received packet.

Optionally, creating the entry includes creating an entry which does not include a destination address of a Web site. Possibly, the packet is directed from or to a load balancer operating in a half NAT mode or full NAT mode.

Optionally, receiving the packet includes receiving a packet directed from the load balancer to a server or from a server to the load balancer. In some embodiments of the invention, creating the entry includes creating the entry using substantially only information in the received packet as it was received. Alternatively or additionally, creating the entry includes creating the entry using information not included in the received packet as it was received. In some embodiments of the invention, creating the entry includes creating the entry using information from a copy of the received packet, previously received by the accelerator.

Optionally, receiving the packet includes receiving a packet from the load balancer and creating the entry includes creating the entry using information from the received packet and from a copy of the received packet forwarded to the load balancer.

In some embodiments of the invention, the method includes receiving, by the accelerator, packets directed to a Web site handled by the load balancer, storing identification information and values of one or more parameters of the packets directed to the Web site, in a temporary storage, and searching the temporary storage for an entry which matches the received packet from the load balancer, wherein creating the entry in the list of destination servers of packet groups is performed only if a match is found.

Optionally, storing the identification information includes storing a unique identification number tagged to the packet by the accelerator. Alternatively or additionally, storing the identification information includes storing at least one of the sequence and acknowledge fields of TCP packets. Further alternatively or additionally, storing the identification information includes storing a leading segment of the payload of the packet.

There is further provided in accordance with embodiments of the present invention, a load balancing accelerator, including an input interface which receives packets directed to a load balancer, a table which lists packet groups and their respective destination servers, the table having entries which can accommodate a plurality of different field sets, a comparator which compares at least one of the packets directed to the load balancer to at least one of the entries of the table, a forwarding unit which forwards at least one of the packets for which a match was found by the comparator, directly to a server, responsive to the contents of the matching entry, and a controller which determines which fields, from the plurality of different field sets, are included in each of the entries of the table.

Optionally, the controller includes a user interface through which the field sets of the entries of the table are configured. Alternatively or additionally, the controller automatically determines the fields included in the entries. In some embodiments of the invention, the controller transmits one or more packets to the load balancer and examines the response of the load balancer to determine the fields included in the entries.

Possibly, the controller determines the fields of the table such that at a single time all the entries of the table have the same fields. Alternatively, the controller determines the fields of the table such that at least some periods of operation the table includes at least two entries with different fields. Optionally, at least one of the entries of the table can be configured to have different field sets. Alternatively or additionally, the table includes a plurality of sub-tables with different field sets.

There is further provided in accordance with an embodiment of the invention, a load balancing accelerator, including an input interface which receives packets directed to a load balancer, a table which lists packet groups and their respective destination servers, a comparator which compares at least some of the packets directed to the load balancer to at least some of the entries of the table, a forwarding unit which forwards directly to a server, at least some of the packets for which a match was found by the comparator, responsive to the contents of the matching entry, the forwarding unit being capable of operating in a plurality of operation modes, at least some of which including changing at least one of the fields of the forwarded packets, and a controller which determines in which mode the forwarding unit operates. Optionally, the forwarding unit is capable of performing splicing. In some embodiments of the invention, the controller determines the operation mode of the forwarding unit based on a user configuration. Alternatively or additionally, the controller determines the operation mode of the forwarding unit based on the contents of packets directed from or to the load balancer. Possibly, the controller determines the operation mode of the forwarding unit by comparing the contents of packets from the load balancer with packets directed to the load balancer.

BRIEF DESCRIPTION OF FIGURES

Particular non-limiting embodiments of the invention will be described with reference to the following description of embodiments, in conjunction with the figures. Identical structures, elements or parts which appear in more than one figure are preferably labeled with a same or similar number in all the figures in which they appear, in which:

FIG. 1 is a schematic block diagram of a server farm, in accordance with an embodiment of the present invention;

FIG. 2 is a load balancing table of an accelerator, in accordance with an embodiment of the present invention;

DETAILED DESCRIPTION OF EMBODIMENTS

Figure 3:
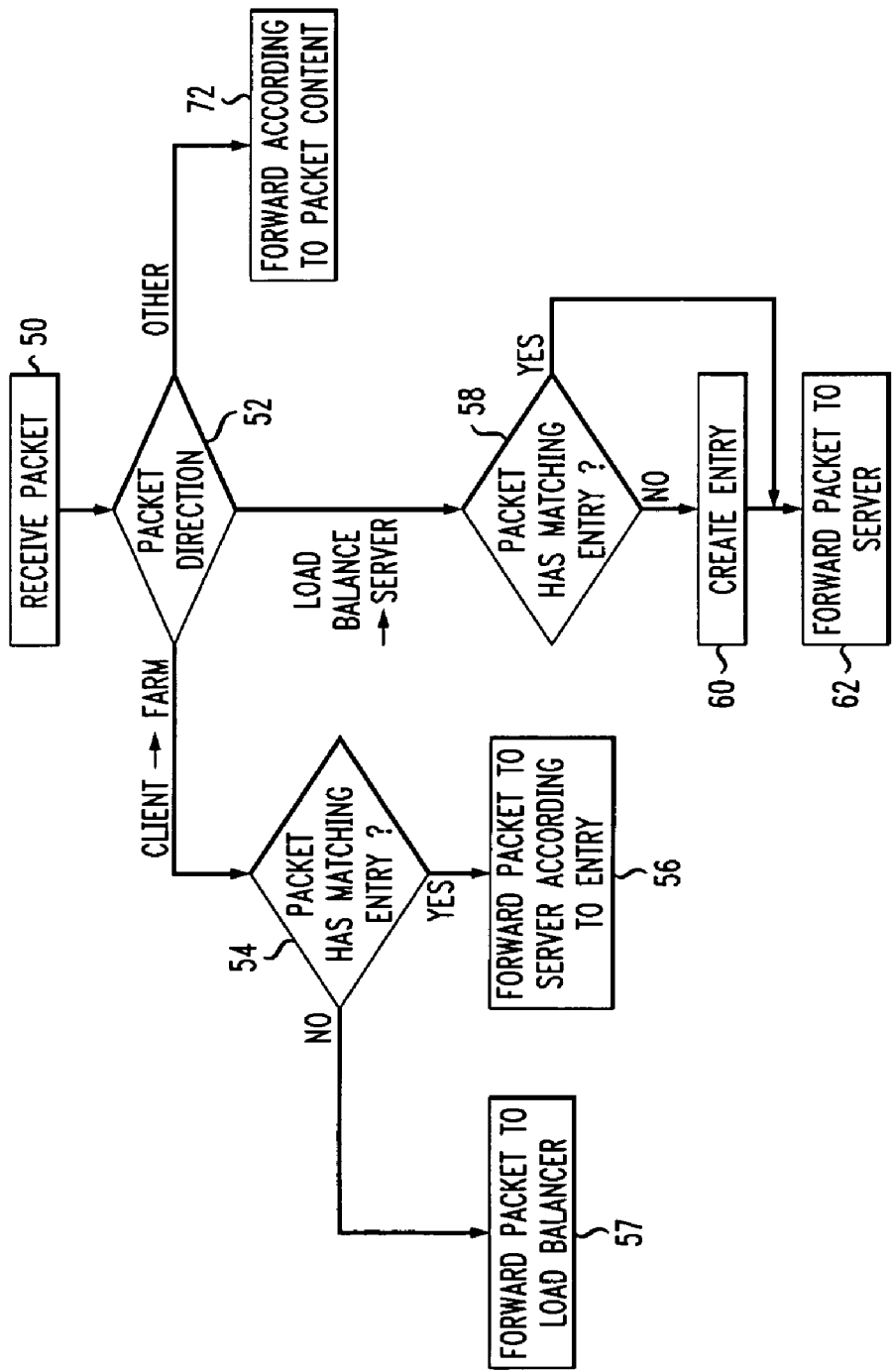
FIG. 3 is a flow chart of the acts performed by an accelerator upon receiving a packet, in accordance with an embodiment of the present invention.

FIG. 1 is a schematic block diagram of a server farm 20, in accordance with an embodiment of the present invention. Server farm 20 comprises a plurality of servers 22 (labeled 22A, 22B, 22C and 22D) which host an Internet Web site. Packets directed to the Web site, i.e., having the IP address of the Web site, are routed to a load balancer 24 which determines to which server 22 the packets should be forwarded. Optionally, load balancer 24 operates according to the half NAT scheme, i.e., the load balancer replaces the value of at least one of the IP destination address and/or TCP/UDP destination port fields of the packets it forwards to the servers 22. Alternatively, load balancer 24 operates in a triangulation mode. Further alternatively, as described hereinbelow, load balancer 24 operates in accordance with a full NAT scheme.

An accelerator 26 operates as a switch which passes the packets between load balancer 24 and the clients and between load balancer 24 and servers 22. Accelerator 26 determines from at least some of the packets it forwards, for at least some packet groups, to which of servers 22 the packets of the group are forwarded. Accordingly, accelerator 26 forwards the packets of the determined groups directly to the respective server 22. In some embodiments of the invention in which load balancer 24 operates in the half NAT mode, accelerator 26 performs the replacement of the IP destination address for the packets it forwards directly to servers 22. Optionally, accelerator 26 also changes the source address of the packets sent from the servers 22 to the client.

FIG. 2 is a load balancing table 30 of accelerator 26 for use when load balancer 24 operates in the triangulation mode, in accordance with an embodiment of the present invention. Table 30 comprises key fields 32 of one or more parameters which identify groups of packets which are always forwarded to the same server 22. One of the differences between table 30 and the prior art is in the number and/or identify of key fields 32. In some embodiments of the invention, key fields 32 comprise fewer than five fields. In some embodiments of the invention, key fields 32 do not comprise fields which relate to the destination of packets (e.g., destination address or port) directed from the client to the farm. In an exemplary embodiment of the invention, key fields 32 include a client address field 34, a client port field 36 and a protocol field 38. Alternatively, key fields 32 do not include protocol field 38, for example, when load balancer 24 only handles TCP packets. Further alternatively, key fields 32 include client address field 34 and a field which identifies the Web site to which the packets relate. This alternative is especially suitable for cases in which load balancer 24 directs all packets of a single client to a single Web site to the same server, as the number of entries required in table 30 is smaller than if the client port is included in the key fields.

In addition to key fields 32, table 30 comprises result fields 40 which relate to the handling of packets matching the key fields 32 of a specific entry. In some embodiments of the invention, result fields 40 comprise a destination field which identifies the server 22 to which packets of the group should be forwarded, for example by stating the MAC address and optionally the VLAN of the server.

FIG. 3 is a flow chart of the acts performed by accelerator 26 upon receiving a packet, in accordance with an embodiment of the present invention. In the method of FIG. 3, accelerator 26 cooperates with load balancer 24 when it operates in a triangulation mode. If (52) a received (50) packet is directed from a client to server farm 20, accelerator 26 determines (54) whether the packet has a matching entry in table 30. If (54) a matching entry is found, the packet is forwarded (56) directly to one of servers 22 according to the result fields 40 in the entry matching the received packet. If (54), however, a matching entry is not found, the packet is forwarded (57) to load balancer 24. The matching is typically performed by comparing the fields of the packet to key fields 32 of the entry. For example, a match is found if the IP source address, the source port and the protocol of the packet match the client address 34, the client port 36 and the protocol 38 listed in the entry.

If (52) the received packet is directed from load balancer 24 to one of servers 22, in addition to forwarding (62) the packet to the server, accelerator 26 determines (substantially as described for determination (54)) whether (58) a matching entry exists in table 30. If (58) a matching entry does not exist, accelerator 26 extracts the source address, source port, protocol and destination server information from the packet and creates (60) a respective entry in table 30. The entry creation (60) is generally performed by placing the source address and port of the packet in fields 34 and 36, the protocol of the packet in field 38 and the destination MAC address and optionally VLAN of the packet in fields 40. Optionally, accelerator 26 creates entries only for some of the groups of packets. For example, in some embodiments of the invention, accelerator 26 has a limited size table and when the table is full additional entries are not created. Alternatively or additionally, accelerator 26 creates entries only for packets of specific protocols, e.g., HTTP and/or FTP, and/or packets which belong to sessions which are predicted to have large amounts of traffic. For example, accelerator 26 may not create entries for packets belonging to a group expected to include very few packets.

In some embodiments of the invention, packets directed from load balancer 24 to a server 22 are not usually received if (58) a matching entry exists, as such packets would be forwarded directly to the respective server 22 and would not be forwarded to load balancer 24. As described above, if such packets are anyhow received they are forwarded directly to the server referenced within the packet. In some embodiments of the invention, accelerator 26 uses the contents of the packet to update the respective entry if the information in the entry is different than in the packet. Optionally, in some embodiments of the invention, accelerator 26 periodically forwards to load balancer 24 packets directed from clients to the farm, so that these packets will be used to refresh their respective entries. Alternatively or additionally, as described hereinbelow, accelerator 26 periodically erases entries from table 30 so that they will be refreshed.

If (52) the received packet is directed to a client, or is directed in any direction other than described above, accelerator 26 forwards (72) the packet according to its contents without any special handling. Such packets directed in other directions include, for example, packets not related to access to farm 20, e.g., packets directed to load balancer 24 itself or to a specific server 22. Alternatively or additionally, accelerator 26 forwards such packets to a neighboring router which determines to where they are to be forwarded.

In some embodiments of the invention, accelerator 26 determines the direction of the packets it receives based on the IP and/or MAC source and/or destination addresses of the packets. Alternatively or additionally, any other direction determination method, such as those described hereinbelow with relation to FIGS. 5 and/or 7, is used. In an exemplary embodiment of the invention, in which load balancer 24 operates in the triangulation mode, the direction of the packets is determined based on their source and destination MAC addresses and their destination IP address. Packets having a source MAC address of load balancer 24 and a destination IP address of a Web site handled by load balancer 24 are directed from load balancer 24 to the server. Packets directed to load balancer 24 from a client have a destination IP address of a Web site handled by load balancer 24 and a destination MAC address of load balancer 24. All other packets which do not fulfill the above descriptions are forwarded without any special measures by accelerator 26.

Figure 4:
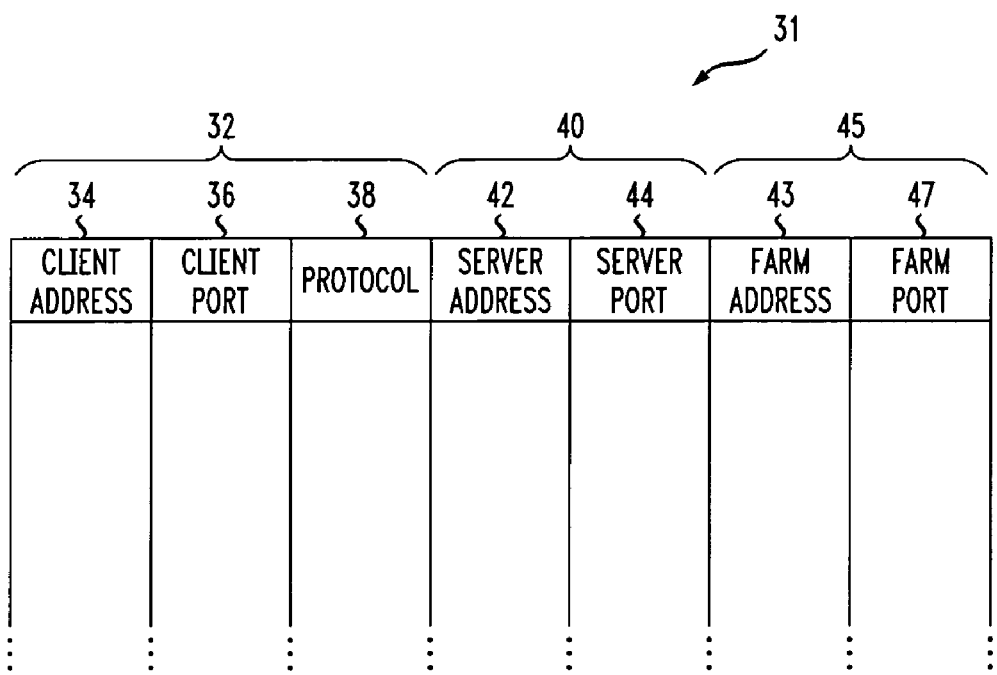
FIG. 4 is a load balancing table of an accelerator for use with a half NAT load balancer, in accordance with an embodiment of the present invention.

FIG. 4 is a load balancing table 31 of accelerator 26 for use when load balancer 24 operates in the half NAT mode, in accordance with an embodiment of the present invention. Table 31 is similar to table 30, however, in some of the embodiments of the invention result fields 40 of table 31 identify servers 22 based on their IP address. In some embodiments of the invention, result fields 40 comprise a server IP address field 42 which states the IP address of the server 22 to which matching client packets (i.e., packets from clients) are forwarded. Optionally, result fields 40 also include a server port field 44 which states the value to which the destination port of matching client packets should be changed. In some embodiments of the invention, a special value in server port field 44 indicates that the original port of the packet should be used.

In some embodiments of the invention, table 31 also includes farm fields 45 which identify the farm address to be inserted into matching packets transmitted from a server 22 to the client. Optionally, farm fields 45 include a farm IP address field 43 and a farm port field 47. Alternatively, accelerator 26 operates with a load balancer 24 which services only a single farm address and a single set of farm values is stored for all the entries of table 31, instead of table 31 including separate farm fields 45 for each entry. Optionally, the IP address and/or port values of farm 20, as stored in the single set of values, are configured into accelerator 26 by a system manager. Alternatively, accelerator 26 learns the IP address and/or port values of farm 20 from a packet transmitted from a client to the farm or from a packet forwarded from load balancer 24 to a client.

Figure 5:
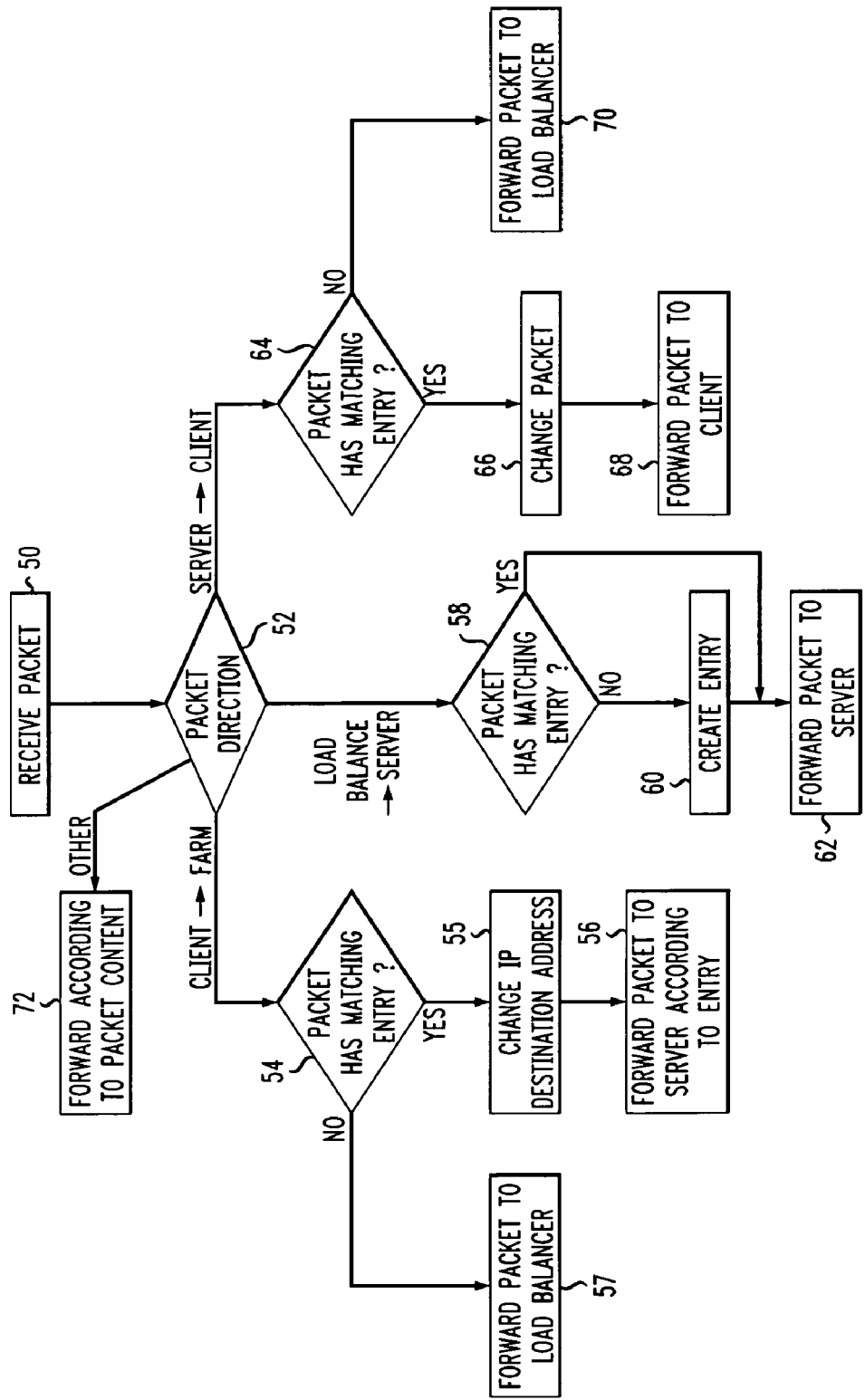
FIG. 5 is a flow chart of the acts performed by an accelerator upon receiving a packet, in accordance with another embodiment of the present invention.

FIG. 5 is a flow chart of the acts performed by accelerator 26 upon receiving a packet, in accordance with an embodiment of the present invention. The method of FIG. 5 is a variation of the method of FIG. 3 in which load balancer 24 operates in the half NAT mode. Therefore, the following description relates only to acts that are different than described with reference to FIG. 3. As shown in FIG. 5, before forwarding (56) packets directed from a client to server farm 20 according to their matching entry, accelerator 26 changes (55) the destination IP address of the packets to the address of the server 22 listed in the result fields 40 of the matching entry. Optionally, accelerator 26 also changes the destination port of the packet to the value of server port field 44 in the matching entry.

Optionally, when accelerator 26 changes (55) the destination IP address of a packet forwarded (56) to a server 22, it stores the replaced IP destination address and/or the replaced destination port in farm fields 45 for use in changing (68) the source fields of the packets sent to the client. Alternatively, accelerator 26 stores values in farm fields 45 only based on the first packet matching the entry that is received from the client and forwarded by the accelerator to a server 22, using the entry. Optionally, a packet which is to be returned to a client before the farm fields 45 of its matching entry are filled in, is passed to load balancer 24 for handling. Possibly, accelerator 26 learns the contents of farm fields 45 of the entry from the packet directed from load balancer 24 to the client.

Alternatively, for example when load balancer 24 operates only for a single farm, in creating (60) an entry, the contents of farm fields 45 are taken from preconfigured values or are learned from one of the packets directed to farm 20. Further alternatively, especially if load balancer 24 represents a plurality of farms, before forwarding (57) a packet directed from a client to a farm, which packet does not have a matching entry, a partial entry is prepared for the packet. The partial entry includes the key fields taken from the packet, as described above with reference to FIG. 3, and farm fields 45 whose values are taken from the destination fields (address and port) of the packet. In creating (60) an entry based on a packet directed from load balancer 24 to a server 22, accelerator 26 finds the partial entry matching the packet and fills in the server address 42 and the server port 44 from the destination fields of the packet.

Alternatively or additionally, creating of partial entries, filling in entries and/or creating entire entries is performed based on packets directed to the client. Values of key fields 32 are taken from the destination fields of packets directed to the clients. Farm fields 45 are taken from source fields of packets directed from load balancer 24 to clients, or are pre-configured by the user when load balancer 24 represents a single farm. The values of result fields 40 are taken from source fields of packets directed from servers 22 to clients.

If (52) the received packet is directed from a server 22 to a client, accelerator 26 determines (64) whether the packet has a matching entry in table 31. A matching entry is found by comparing the destination fields of the packet to key fields 32. If a respective entry exists, accelerator 26 changes (66) the source address field and optionally the source port field to the IP address and port values in farm fields 45. The changed packet is then forwarded (68) to the client. If a matching entry was determined (64) not to exist, the packet is forwarded (70) to load balancer 24 for handling. Alternatively, the source port and address are changed to the representative values of farm 20, or to any other default values, and the packet is forwarded (68) directly to the client.

Packets directed in other directions, e.g., from load balancer 24 to a client, are forwarded (72) according to their content towards their destination.

In some embodiments of the invention, accelerator 26 determines (52) the direction of the received packet based on the source and destination IP addresses of the packet. For example, when load balancer 24 operates in the half NAT mode, packets directed to farm 20 from clients have a destination IP address of the farm and packets from load balancer 24 to a server 22 have a destination IP address of a server. Packets directed to clients from a server 22 have a source IP address of the server, while packets to clients from load balancer 24 have as their source IP address the address of the farm.

Additionally, or alternatively, accelerator 26 determines (52) the direction of the received packet based on the source and destination ports of the packet. For example, packets directed to the HTTP (or other server protocol) port are either directed to farm 20 from clients or are directed to a server 22 from load balancer 24. Packets having the HTTP port number as their source port are directed to the client from a server 22 or from load balancer 24. Packets having other port numbers are optionally considered unrelated to farm 20 and are simply forwarded (59) toward their destination. Alternatively or additionally, packets directed to farm 20 have a different port number than packets directed to servers.

Alternatively or additionally, packets from different directions are transmitted to accelerator 26 on different VLANs and/or with different MAC addresses. For example, clients communicate with farm 20 on a first VLAN, and servers 22 communicate with load balancer 24 on a second VLAN. The VLAN assignment may be performed using any method known in the art. In some embodiments of the invention, instead of, or in addition to, using different VLANs, accelerator 26 has different MAC addresses which are used for different packets. For example, packets from the clients are received with a first destination MAC address and packets from the servers are received with a second destination MAC address. Alternatively or additionally, servers 22 transmit to accelerator 26 messages related to farm 20 with a first IP and/or MAC address and messages unrelated to the farm with a second IP and/or MAC address.

In some embodiments of the invention, the MAC address of the packet is additionally or alternatively used to determine the direction of the packet. Packets carrying a source MAC address of the load balancer 24 are from the load balancer and packets carrying the source MAC address of one of servers 22 is from that server.

Alternatively or additionally, each server is assigned two or more different IP addresses. A first IP address is used to identify the server for its private traffic, while packets it receives as part of farm 20 use the second IP address. Optionally, servers 22 have a separate IP address for each Web site which they host. Alternatively or additionally, each server is assigned two or more different MAC addresses.

Alternatively to accelerating both the traffic to and the traffic from the client, accelerator 26 accelerates the operation of load balancer 24 only in the direction to the client, as the great percentage of Internet traffic flows in the direction to the client. In this alternative, packets directed from the client to the farm are forwarded (57) to load balancer 24 without determining whether the packets have a matching entry.

Figure 6:
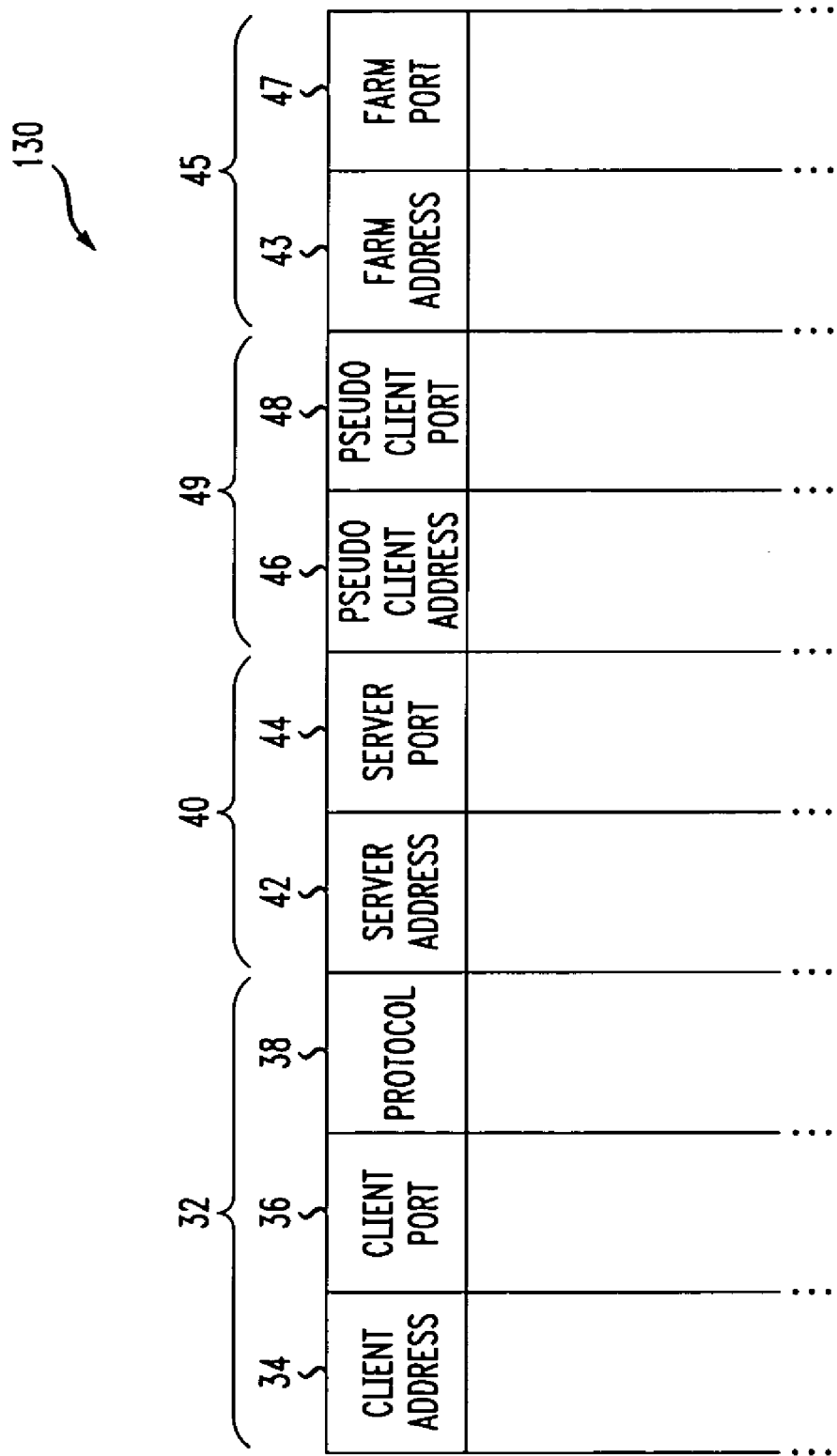
FIG. 6 is a load balancing table of an accelerator, in accordance with an embodiment of the present invention.

FIG. 6 is a load balancing table 130 of accelerator 26 for use in the method described hereinbelow with reference to FIG. 7, in accordance with an embodiment of the present invention. Load balancing table 130 is similar to table 31 described above with reference to FIG. 4, with additional fields useful for operation with a load balancer operating in a full NAT mode. It is noted, however, that table 130 may be used also with load balancers operating in other modes. Similar to table 31, table 130 comprises a client address field 34 and a client port field 36 which refer to the original source values assigned by the client, a protocol field 38, farm fields 45 and result fields 40 (e.g., server address field 42 and server port field 44), referred to for clarity of the following description as server fields 40. In addition, table 130 includes pseudo client fields 49, e.g., a pseudo client-address field 46 and a pseudo client-port field 48.

In some embodiments, the fields used as key fields (i.e., fields to which corresponding packet fields are compared in determining whether the packet matches an entry) depend on the direction of flow of the packet for which a match is sought. Packets directed from a client to farm 20 are compared to table 130 based on client key fields, which include fields that match the packets as they are generated by the client. In an exemplary embodiment, the client key fields include client address field 34, client port field 36 and optionally protocol field 38. Packets directed from load balancer 24 to one of servers 22 and/or directed from one of servers 22 to a client are compared to table 130 based on server key fields which include fields which match the packets after their fields are changed by load balancer 24. In some embodiments of the invention, the server key fields include pseudo client fields 49 and optionally protocol field 38 and/or one or more of server fields 40.

In some embodiments of the invention, the entries of tables 30, 31 and/or 130 are erased a predetermined time after their creation. Alternatively or additionally, entries are erased if they are not used for a predetermined time. In some embodiments of the invention, tables 30, 31 and/or 130 include an aging field which is used to follow the time for which the entry exists and/or the time in which the entry is not in use. Optionally, accelerator 26 determines when a session with a client ends and accordingly erases entries from tables 30, 31 and/or 130. For example, accelerator 26 may erase entries a predetermined time after a packet with a set FIN bit (which indicates the end of a connection) matching the entry, is received.

Figure 7:
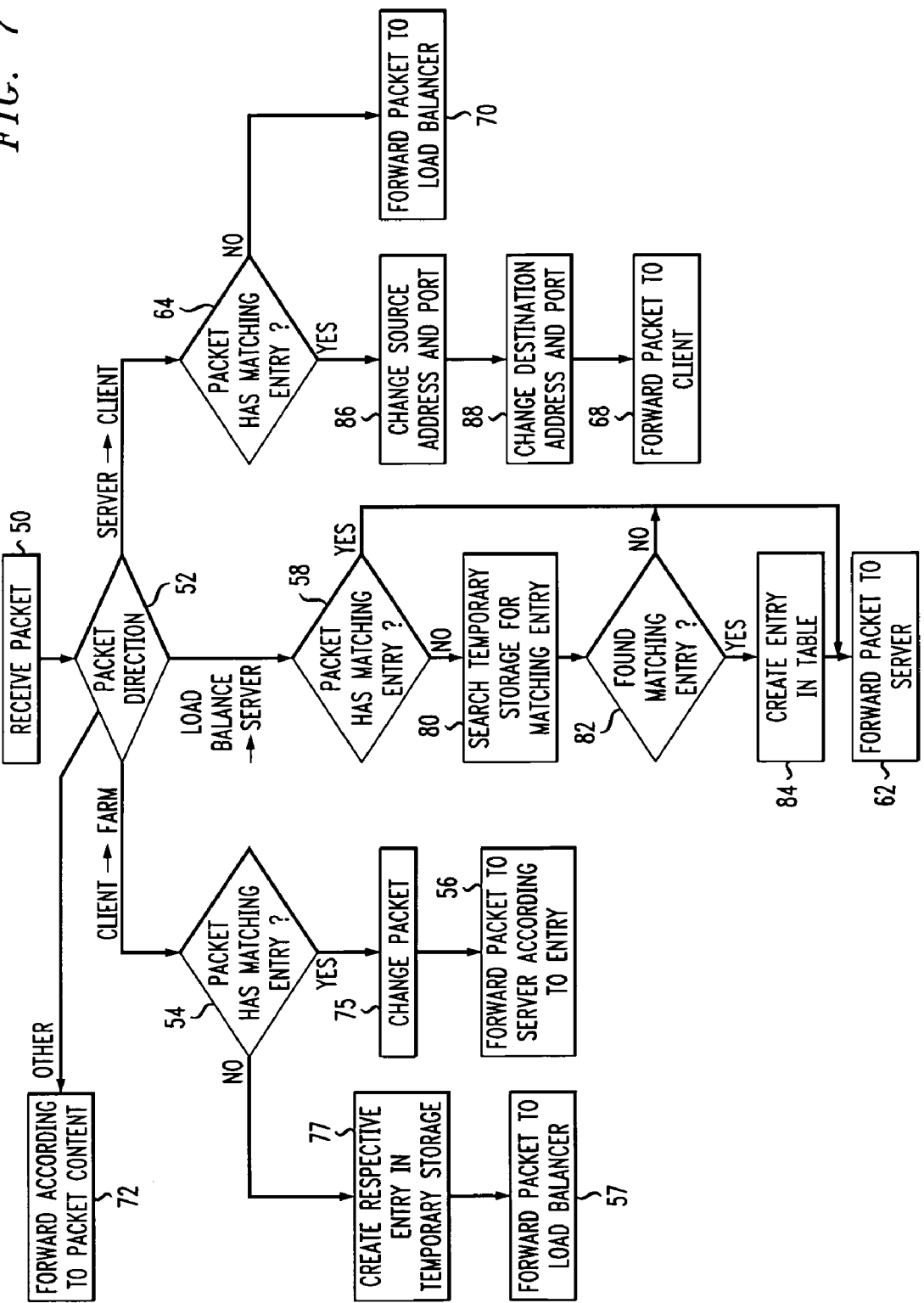
FIG. 7 is a flow chart of the acts performed by an accelerator upon receiving a packet, in accordance with still another embodiment of the present invention.

FIG. 7 is a flow chart of the acts performed by accelerator 26 upon receiving a packet, in accordance with an embodiment of the present invention. The method of FIG. 7 is a variation of the method of FIG. 5 in which load balancer 24 operates in a full NAT mode. In the method of FIG. 7, accelerator 26 correlates between packets provided to load balancer 24 and the same packet after it was handled by the load balancer. Entries in table 130 are created based on parameters of the correlated packets. In some embodiments of the invention, entries are created in a temporary storage for some or all of the packets provided to load balancer 24, in order to perform the correlation.

If (52) a received (50) packet is directed from a client to server farm 20, accelerator 26 determines (54) whether the packet has a matching entry in table 130 based on the client key fields. For example, the source address and port of the packet are compared, respectively, to fields 34 and 36 and the protocol field of the packet is compared to field 38. If (54) a matching entry is found, accelerator 26 changes (75) the source and destination IP addresses and ports with the values in fields 42, 44, 46 and 48 (FIG. 6) of the matching entry. The changed packet is then forwarded (56) directly to the server 22, identified by changed IP destination field. Optionally, the replaced destination IP address and/or port are stored in farm address field 43 and farm port field 47, respectively, for use when a response packet travels back to the client.

If (54) a matching entry is not found, the packet is forwarded (57) to load balancer 24. In addition to forwarding (57) the packet to load balancer 24, accelerator 26 creates (77) an entry for the packet in the temporary storage. In some embodiments of the invention, the entry in the temporary storage includes client packet information, e.g., the source IP address and source port of the packet, together with information required to identify the packet, as described hereinbelow. Optionally, the client packet information stored in the temporary storage also includes the destination address and/or destination port of the packet. Alternatively or additionally, the client packet information also includes farm information taken from the destination fields of the packet.

Optionally, before creating an entry for a received packet in the temporary storage, accelerator 26 checks whether another entry of the temporary storage has the same client packet information (e.g., source IP address and source port) as the received packet. If such an entry in the temporary storage is found, an entry is not created for the received packet in the temporary storage, as only a single packet correlation is required to create in table 130 an entry for a packet group. Alternatively, an entry is created to replace the older entry of the source group, if the older entry is in the temporary storage beyond a predetermined time. Further alternatively, a predetermined number of entries in the temporary storage for packets of the same source group are allowed, to allow faster construction of entries in table 130, for example when a packet is lost. In some embodiments of the invention, the predetermined number of allowed entries in the temporary storage for the same source group is dynamically adjusted based on the amount of free space in the temporary memory and/or the load on load balancer 24.

In some embodiments of the invention, accelerator 26 erases entries from the temporary storage after a predetermined time from their creation and/or periodically erases all the entries in the temporary storage. Alternatively or additionally, when the temporary storage is full and a new entry should be created the oldest entry is overwritten. When a match is found and an entry is created in table 130 the respective entry in the temporary storage is erased.

If (52) the received packet is directed from load balancer 24 to one of servers 22, in addition to forwarding (62) the packet to the server, accelerator 26 determines whether (58) a matching entry exists in table 130. If (58) a matching entry does not exist, accelerator 26 searches (80) through the temporary storage for an entry matching the packet, based on the stored identification information. If (82) a matching entry is found in the temporary storage, accelerator 26 creates (84) an entry in table 130, based on parameters of the received packet and client packet information from the matching entry of the temporary storage. In some embodiments of the invention, the values of client address field 34 and client port field 36 are taken from the respective source fields of the client packet information in the temporary storage. The value of protocol field 38 is taken from the protocol field of the packet. The values of the server fields 40 are taken from destination fields of the packet and the values of pseudo client fields 49 are taken from respective source fields of the packet. Optionally, the values of farm fields 45 are taken from the farm fields in the temporary storage.

If (52) the received packet is directed from a server 22 to a client, accelerator 26 determines (64) whether the packet has a respective entry in table 130, based on the server key fields, as defined above. If a respective entry exists, accelerator 26 changes (86) the source IP address and source port of the packet to the source IP address and the source port of farm 20. In addition, accelerator 26 changes (88) the destination IP address and destination port of the packet to the values of client fields 34 and 36 of the matching entry. The changed packet is then forwarded (68) to the client. If a matching entry was determined (64) not to exist, the packet is forwarded (70) to load balancer 24 for handling.

Packets directed in other directions, e.g., from load balancer 24 to a client, are forwarded (72) according to their content towards their destination.

In some embodiments of the invention, accelerator 26 determines the direction of the packets it receives using any of the methods described above with reference to FIG. 5. In an exemplary embodiment of the invention, packets directed to the Web site from a client are identified based on their destination IP address being the address of a Web site handled by farm 20. Packets from load balancer 24 to a server are identified based on their source MAC address being of load balancer 24 and their source IP address being a pseudo client address used by load balancer 24. Packets directed from a server 22 to load balancer 24 are identified based on their destination IP address being a pseudo client address and optionally their destination MAC address being the address of load balancer 24. Packets directed from load balancer 24 to clients are identified based on their source IP address being the address of a Web site handled by farm 20. Packets which do not fit into the above categories are forwarded as not relating to farm 20.

In some embodiments of the invention, when a received packet directed to load balancer 24 matches an entry in the temporary storage, the entry in the temporary storage is deleted and no entry is created for the received packet. Thus, accelerator 26 does not create entries in table 30 based on matching packets (from and/or to load balancer 24) when the matching may be in error due to additional packets having identical identification information are passing through the network.

Alternatively or additionally, before creating an entry in the temporary memory and/or in table 130, accelerator 26 evaluates the reliability of the identification information of the packet. If the information is not sufficiently reliable, i.e., the chances that a different packet with the same identification information will be received by accelerator 26, an entry is not created. Unreliable identification information may be due to a packet being very short or a packet carrying very common information.

In some embodiments of the invention, entries in the temporary storage are stored for a predetermined time after which it is assumed that the packet was lost and hence the entry is erased. Alternatively, when the temporary storage is filled the oldest entry is overwritten. When a match is found and an entry in table 130 has been created (84), the entry is erased from the temporary storage.

In some embodiments of the invention, the information used to identify a packet in the temporary storage includes values of one or more specific fields of the packet, which specific fields have relatively low probabilities of repeating unintentionally in two different frames. In some embodiments of the invention, the specific fields are taken from the various headers of the frames. In some embodiments of the invention, the identification information does not include fields that may be changed by load balancer 24, e.g., the VLAN and/or IP and MAC addresses of the packet. Optionally, the identification information does not include fields which have the same value for a large number of frames, e.g., the IP header length and/or version. In an exemplary embodiment of the invention, the specific fields include, for TCP packets, one or more of the sequence and acknowledge fields of the TCP header and the length of the packet. In an exemplary embodiment of the invention, the specific fields include, for HTTP packets, a URL field and/or a cookie field.

Alternatively or additionally, the identification information includes random fields which are easy to compare and/or which have a low or no correlation between any two randomly selected packets passing through accelerator 26. In an exemplary embodiment of the invention, the random fields include a predetermined number, e.g., between 50-100, of leading, middle and/or ending bytes. The leading bytes are optionally counted from after the IP header, from after the transport header or from after any other header, so that they do not include fields which may be changed by load balancer 24. In some embodiments of the invention, a combination of one or more specific fields and of one or more random fields is used.

Further alternatively or additionally, the identification information includes the entire packet excluding those fields which may be changed by load balancer 24.

The method of FIG. 7 may be used for various types of full NAT load balancing modes. In one full NAT mode, load balancer 24 replaces the source and destination IP addresses of packets it forwards to and from servers 22. Optionally, in this full NAT mode, load balancer 24 replaces the source and destination port fields of the packets it forwards. In another full NAT mode (referred to as splicing), load balancer 24 changes the TCP sequence numbers (including acknowledgment numbers) of packets it forwards, possibly in addition to the IP addresses and/or protocol ports. In this mode, table 130 preferably includes one or more additional fields for use in changing the TCP sequence numbers. In an exemplary embodiment of the invention, the sequence number of packets transferred to load balancer 24 are stored in the temporary storage with the client packet information. When a matching packet from load balancer 24 to a server 22 is received, the difference between the sequence numbers in the received packet and the temporary storage and/or the sequence numbers themselves, are stored in the created entry. In still another full NAT mode, referred to herein as proxy translation, load balancer 24 changes the contents of HTTP requests it forwards to a proxy format, possibly in addition to other changes of other modes.

In some embodiments of the invention, the fields used in matching packets forwarded to load balancer 24 with packets received from load balancer 24 are chosen according to the specific mode in which load balancer 24 is operating. Alternatively the fields used in the matching are ones which do not change in all the modes. In the proxy translation mode, accelerator 26 takes into account the changes performed in the proxy translation in matching the packets.

In some embodiments of the invention, accelerator 26 tags a unique identification number to packets directed to farm 20, which it forwards to load balancer 24. This unique identification number is used as the identification information. The unique identification number may be tagged to the frames using various methods. In some embodiments of the invention, an additional field, e.g., an additional header or tail, including the unique identification number is added to the frames transmitted to load balancer 24. Alternatively or additionally, an IP option field and/or a TCP option field which includes the unique identification number is added to the frame. Optionally, the additional field is not added to packets which are at the maximal length beyond which the frame must be fragmented.

In some embodiments of the invention, the unique identification number is placed within an existing field of the frames. Optionally, the unique identification number is placed in a reserved field which is not in use and is not altered by load balancer 24, e.g., the reserved bits in the type of service (TOS) field of the IP header and/or the fragmentation field of the IP header in frames which do not include fragments. Optionally, when the fragmentation field is used to store the unique identification number, accelerator 26 does not change and does not learn from frames which are fragmented.

Alternatively or additionally, accelerator 26 replaces the value of one or more frame fields which may be in use, e.g., the fragmentation field of the IP header, and returns the original value when the frames return on their way back. In some embodiments of the invention, accelerator 26 identifies whether the current value of the replaced field is required and stores the original value only if the value is required, e.g., the frame was actually fragmented.

In some embodiments of the invention, the unique identification number is added to the received frames only when accelerator 26 knows that all frames passing through accelerator 26 to load balancer 24 must return back through accelerator 26. This may happen, for example, when load balancer 24 is only connected through one or more ports of accelerator 26. In some embodiments of the invention, accelerator 26 removes the unique identification number when the frame returns from load balancer 24. In some embodiments of the invention, a system manager configures accelerator 26 with notification on whether load balancer 24 is only connected through accelerator 26. Alternatively or additionally, accelerator 26 keeps track of the IP destination addresses of frames it receives from load balancer 24 and tags the unique identification number only to frames which have an IP destination address for which a frame was previously received from load balancer 24.

Alternatively, the unique identification number does not alter the frame in a manner which bothers routers and/or servers which are not aware of the meaning of the unique identification number, and the unique identification number is left in the frame.

In some embodiments of the invention, accelerator 26 does not create entries in table 130 for some groups of packets, as described hereinabove with reference to table 30. Optionally, accelerator 26 does not create entries in the temporary storage for packets for which entries in table 130 are not created according to the rules of accelerator 26.

In some embodiments of the invention, accelerator 26 may operate with load balancers 24 that operate in accordance with different modes of operation. Optionally, a system manager configures accelerator 26 in accordance with the operation mode of load balancer 24.

Alternatively or additionally, accelerator 26 determines, automatically, whether load balancer 24 operates in a triangulation mode, in half NAT mode, full NAT mode or any other mode. In some embodiments of the invention, when accelerator 26 begins to operate and/or periodically, it checks the mode of operation of load balancer 24. Periodic checking of the mode of operation is desired, for example, in those embodiments in which load balancer 24 may be replaced and/or reconfigured during the operation of accelerator 26. In some embodiments of the invention, the automatic determination is performed by transmitting an identifiable packet to the load balancer and determining how the identifiable packet is handled by the load balancer. In some embodiments of the invention, the identifiable packet is generated by accelerator 26 in order to test load balancer 24. Alternatively, the identifiable packet comprises a packet received from a client, which accelerator 26 learns to identify. In some embodiments of the invention, the identifiable packet is marked by accelerator 26 in order to allow its identification. Alternatively or additionally, accelerator 26 stores one or more unique fields (or fields which rarely repeat) of the identifiable packet, which allow identification of the packet. Alternatively or additionally to using an identifiable packet, when accelerator 26 tests load balancer 24 it sends concurrently only a limited number of packets, e.g., only a single packet, to load balancer 24.

In some embodiments of the invention, accelerator 26 may operate with a load balancer 24, which directs all packets from a single client IP address to a single server 22. Such a load balancer 24 preferably represents only a single Web site. In some of these embodiments, accelerator 26 may be configured by a system manager such that key fields 32 include only source address field 34. Thus, the number of entries required in table 30 is reduced and the operation of accelerator 26 is accelerated. Alternatively or additionally, accelerator 26 automatically tests load balancer 24 to determine whether it forwards packets from the same client IP address to different servers 22. In some embodiments, accelerator 26 uses a predetermined test sequence which includes a plurality of test packets having the same client address but different source ports and/or protocols. Accelerator 26 determines from the handling of the test packets by load balancer 24, in which operation mode the load balancer operates.

In some embodiments of the invention, the test sequence includes a plurality of packets with different source addresses and/or protocols for each of a plurality of source addresses. In some embodiments of the invention, the test sequence is chosen responsive to the modes in which load balancer 24 may operate.

In some embodiments of the invention, accelerator 26 may receive, through a communication network, updates of the test sequence to be used in determining the operation mode of load balancer 24. Thus, when a load balancer with a new operation mode is introduced, the test sequence for differentiating this new operation mode may be downloaded to accelerator 26 and no hardware changes are required in the accelerator.

In some embodiments of the invention, accelerator 26 comprises a plurality of load balancing sub-tables of different types (e.g., 30, 31, 130) and/or with different key fields, which are used for the different operation modes of the load balancer.

Figure 8:
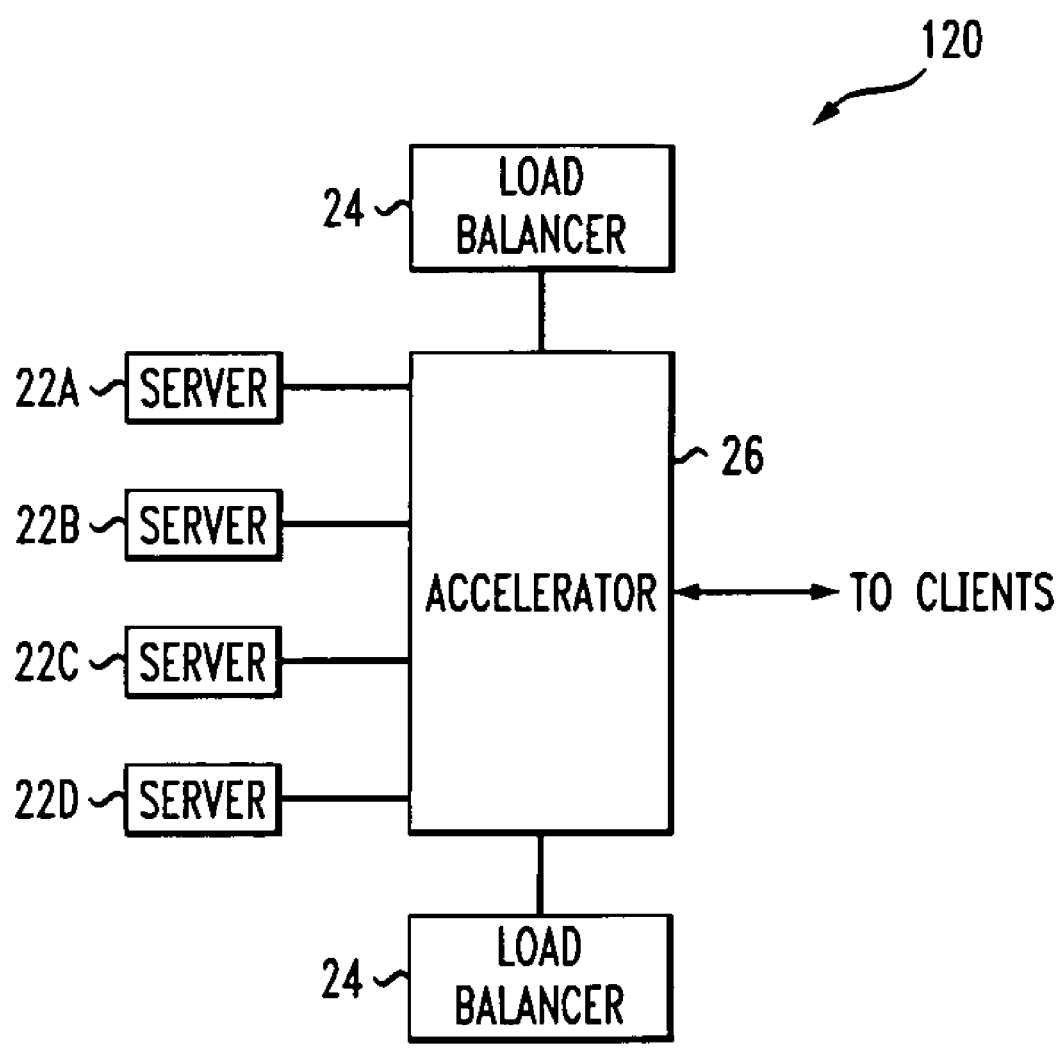
FIG. 8 is a schematic block diagram of a server farm operating with a plurality of load balancers, in accordance with an embodiment of the present invention.

FIG. 8 is a schematic block diagram of a server farm 120 operating with a plurality of load balancers 24, in accordance with an embodiment of the present invention. Server farm 120 includes a plurality of servers 22 each of which hosts one or more Web sites. Each load balancer 24 handles packets of one or more of the Web sites of farm 120. Optionally, packets of each of the Web sites are handled by a specific one of load balancers 24. Alternatively or additionally, one or more of load balancers 24 service a plurality of Web sites. Each of load balancers 24 may operate in accordance with any of the above described operation modes, specifically, different load balancers 24 may operate in different modes, concurrently. Furthermore, the same load balancer 24 may operate in different modes at different times.

An accelerator 26 accelerates the operation of load balancers 24. In some embodiments of the invention, a system manager configures accelerator 26 with the IP addresses of the Web sites of farm 120 and the respective load balancer 24 of each of the sites. For each of the Web sites of farm 120, accelerator 26 manages a separate load balancing sub-table. Alternatively, a single load balancing sub-table is assigned to some or all of the sites which are handled by their respective load balancers in a single mode. Further alternatively, a single sub-table is assigned to each of load balancers 24.

When a packet is received which is directed from a client to a Web site, accelerator 26 determines which sub-table to use in handling the packet, based on the destination IP address of the packet (i.e., the address of the Web site). The destination IP address also defines the load balancer to which the packet is to be forwarded if necessary. Alternatively or additionally, accelerator 26 determines which sub-table to use in handling the packet and/or the load balancer 24 to which the packet should be forwarded, if necessary, based on the destination MAC address and/or the VLAN of the packet.

For packets directed from one of load balancers 24 to a server 22, accelerator 26 chooses the respective sub-table of the packet, based on the source MAC address of the packet which is the MAC address of the load balancer handling the web site of the packet and optionally the VLAN of the packet. Alternatively or additionally, the IP source address of the packet is used, when load balancer 24 operates in a full NAT mode. Further alternatively or additionally, the destination MAC address of the packet (or IP address in full NAT mode) is compared to the MAC addresses of servers 22, and accordingly a sub-table is chosen. In this alternative, each server handles only Web sites of a single load balancer.

For packets directed from one of servers 22 to a client, accelerator 26 chooses the respective sub-table of the packet, based on a comparison of the source MAC address of the packet to the MAC addresses of servers 22. Alternatively, the source IP address in the half NAT mode and destination IP address in a full NAT mode are used. Further alternatively or additionally, the packets are compared to all the tables of accelerator 26 to find the respective entry of the packet.

In some embodiments of the invention, the information required by accelerator 26 for proper operation, in any of the specific embodiments described above, is configured into accelerator 26 by a system manager. The required information includes, for example, one or more of MAC and/or IP addresses of load balancers 24 and/or servers 22, IP addresses of the Web sites serviced by farm 20 and/or the VLANs on which packets are received from different directions. Alternatively or additionally to configuring the required information, at least some of the required information is determined automatically by accelerator. Optionally, accelerator 26 determines MAC addresses of load balancer 24 and/or servers 22 based on the configured IP addresses, using any method known in the art, for example using address resolution protocol (ARP) queries. Alternatively or additionally, the required information is determined automatically by accelerator 26, for example using a poling protocol designed for identifying neighboring servers and/or load balancers and/or for receiving information from neighboring servers and/or load balancers.

In some embodiments of the invention, each sub-table is associated with an IP address and optionally a port representing the Web site with which the sub-table operates. Alternatively, the sub-table includes one or more additional fields that list, for each entry, the representative IP address and optionally the port of the Web site to which the entry relates.

In some embodiments of the invention, accelerator 26 comprises a plurality of physical sub-tables, which are dynamically assigned to Web sites and/or load balancers 24. Optionally, the fields of the sub-tables are dynamically adjusted according to the load balancer 24 to which the sub-table was assigned, i.e., according to the operation mode (e.g., full NAT, half NAT) of the load balancer. Alternatively or additionally, accelerator 26 comprises different types of physical sub-tables (e.g., tables 30, 31 and 130 described above) which are assigned to load balancers 24 according to their operation modes (e.g., triangulation, half NAT, full NAT).

Alternatively or additionally, accelerator 26 comprises one or more structural tables, the entries of which are dynamically allocated to different sub-tables of respective Web sites and/or load balancers. An index of the structural table indicates to which sub-table each of the entries belongs. Thus, the division of the entries between the different sub-tables is performed dynamically and the chances of the entries of one of the sub-tables all being filled when other sub-tables are not full, is substantially reduced.

In some embodiments of the invention, accelerator 26 operates also with a plurality of load balancers that service the same Web site. Optionally, the sub-tables in these embodiments include an additional field that identifies the load balancer 24 which handled the packets of the entry, for example based on the MAC address. Alternatively, such fields are not required, for example, when load balancers 24 operate without using tables.

In some embodiments of the invention, load balancer 24 is optimized for operation with accelerator 26. For example, due to the use of accelerator 26 load balancer 24 requires fewer entries in a table, if it uses a table.

Although the above description relates to accelerator 26 operating with a load balancer which operates with a server farm, the present invention may be used also with load balancers which operate in other configurations, such as load balancers which perform cache redirection. Therefore, the term server in the present application is taken to include proxy servers.

It is noted, that the present invention is not limited for use with a single unit which performs the tasks of accelerator 26. Specifically, two or more units may cooperate in performing the tasks of accelerator 26. For example, a first unit may intercept packets directed from clients to load balancer 24 and a second unit may intercept packets directed from load balancer 24 to servers 22.

It is noted that although the present invention has been described in relation to the TCP/IP protocol suite, some aspects of the invention may be implemented with relation to other packet based transmission protocols, such as, for example IPX, DECNET and the ISO protocols. Furthermore, although the above embodiments relate to the Ethernet link layer, the present invention may be used with substantially any layer-2 protocol including, but not limited to, Frame relay, point to point modem, ISDN, ASDL and ATM.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents that perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A load balancing accelerator, comprising:
an input interface which received packets directed to a load balancer, the load balancer and the load balancing accelerator being separate from one another;
a table which lists packet groups and their respective destination servers, the table having physical entries which can accommodate different field sets for storage of data entries;
a comparator which compares at least one of the packets directed to the load balancer to one or more of the data entries of the table;
a forwarding unit which forwards at least one of the packets for which a match was found by the comparator, directly to a server, responsive to the contents of the matching data entry; and a controller which determines in which field set, from the plurality of different field sets, each of the data entries of the table is stored;
wherein the controller comprises a user interface through which a user may configure the field sets in which the data entries of the table are stored.

2. A load balancing accelerator, comprising;
an input interface which receives packets directed to a load balancer, the load balancer and the load balancing accelerator being separate from one another;
a table which lists packet groups and their respective destination servers, the table having physical entries which can accommodate different field sets for storage of data entries;
a comparator which compares at least one of the packets directed to the load balancer to one or more of the data entries of the table;
a forwarding unit which forwards at least one of the packets for which a match was found by the comparator, directly to a server, responsive to the contents of the matching data entry; and a controller which determines in which field set, from the plurality of different field sets, each of the data entries of the table is stored;
wherein the controller automatically determines the field sets in which the data entries are stored; and
wherein the controller transmits one or more packets to the load balancer and examines the response of the load balancer to determine the field sets in which the data entries are stored.

3. A load balancing accelerator, comprising:
an input interface which receives packets directed to a load balancer, the load balancer and the load balancing accelerator being separate from one another;
a table which lists packet groups and their respective destination servers, the table having physical entries which can accommodate different field sets for storage of data entries;
a comparator which compares at least one of the packets directed to the load balancer to one or more of the data entries of the table;
a forwarding unit which forwards at least one of the packets for which a match was found by the comparator, directly to a server, responsive to the contents of the matching data entry; and a controller which determines in which field set, from the plurality of different field sets, each of the data entries of the table is stored;
wherein the controller determines the field sets in which the data entries of the table are stored, such that at least during some periods of operation of the accelerator, the table includes at least two data entries stored in different field sets.

* * * * *